United States Patent
Haltmaier (10) Patent No.: US 10,708,514 B2
(45) Date of Patent: Jul. 7, 2020

(54) BLENDING DEPTH IMAGES OBTAINED WITH MULTIPLE EXPOSURES

(71) Applicant: Analog Devices, Inc., Norwood, MA (US)

(72) Inventor: Rick Haltmaier, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 36 days.

(21) Appl. No.: 16/118,389

(22) Filed: Aug. 30, 2018

(65) Prior Publication Data

US 2020/0077011 A1 Mar. 5, 2020

(51) Int. Cl.
*H04N 5/235* (2006.01)
*G06T 7/521* (2017.01)

(52) U.S. Cl.
CPC .......... *H04N 5/2355* (2013.01); *G06T 7/521* (2017.01); *G06T 2207/10028* (2013.01)

(58) Field of Classification Search
CPC ........ G01S 17/10; G01S 7/4868; G01S 7/487; G06T 2207/10052; G06T 7/521; G06T 2207/10028; G06T 5/002; G06T 5/007; G06T 5/50; H04N 13/207; H04N 13/271; H04N 5/2254; H04N 5/2355; H04N 5/3696; H04N 5/2351; H04N 5/2353; H04N 5/2354; H04N 5/2356; H04N 13/243; H04N 2013/0081; H04N 13/239; H04N 13/128; H04N 5/357
USPC ......... 348/135, 348, 631; 250/214.1, 370.08, 250/559.07, 559.29, 559.38
See application file for complete search history.

(56) References Cited

U.S. PATENT DOCUMENTS

| | | | |
|---|---|---|---|
| 5,309,243 A | 5/1994 | Tsai | |
| 5,420,635 A | 5/1995 | Konishi et al. | |
| 5,455,621 A | 10/1995 | Morimura | |
| 5,638,118 A | 6/1997 | Takahashi et al. | |
| 5,801,773 A | 9/1998 | Ikeda | |
| 8,139,142 B2* | 3/2012 | Bamji | G01S 17/89 348/348 |
| 8,406,569 B2 | 3/2013 | Segall et al. | |
| 2006/0114333 A1* | 6/2006 | Gokturk | G01S 7/487 348/222.1 |
| 2014/0152694 A1 | 6/2014 | Narasimha et al. | |
| 2015/0362698 A1* | 12/2015 | Lansel | G02B 13/0015 348/360 |
| 2016/0245920 A1* | 8/2016 | Boufounos | G01S 17/89 |
| 2016/0334508 A1* | 11/2016 | Hall | G01S 7/4811 |

(Continued)

OTHER PUBLICATIONS

Debevec et al., *Recovering High Dynamic Range Radiance Maps from Photographs*, University of California at Berkeley, © 1997, 10 pages.

(Continued)

*Primary Examiner* — Nathnael Aynalem
(74) *Attorney, Agent, or Firm* — Patent Capital Group (57) ABSTRACT

To extend dynamic range, a depth imager can expose a scene with two different exposures to obtain two depths. The two different exposures are selected to have respective depth ranges that overlap each other. The two depths can be combined by taking into account the difference in exposures and where the two depths are located with respect to boundaries of an overlapping range of the two depth ranges. The combination of the two depths in this manner can help avoid image artifacts such as contouring.

23 Claims, 9 Drawing Sheets

(56) References Cited

U.S. PATENT DOCUMENTS

2017/0142312 A1* 5/2017 Dal Mutto ............ H04N 13/243
2017/0289515 A1* 10/2017 Li ........................ H04N 5/2354

OTHER PUBLICATIONS

Nayar et al., *High Dynamic Range Imaging: Spatially Varying Pixel Exposures*, 1063-6919/00 © 2000 IEEE, 8 pages.
Madden, *Extended Intensity Range Imaging*, University of Pennsylvania, ScholarlyCommons, Dec. 1993, 22 pages.
Heo et al., *Ghost-Free High Dynamic Range Imaging*, © Springer-Verlag Berlin Heidelberg 2011, 15 pages.
Mullen et al., *Extended Range Underwater Imaging Using A Time Varying Intensity (TVI) Approach*, 0-933957-38-1 © 2009 MTS, 9 pages.
Mitsunaga et al., *Radiometric Self Calibration*, 0-7695-0149-4/99 © 1999 IEEE, 7 pages.
Burt et al., *Enhanced Image Capture Through Fusion*, 0-8186-3870-2/93 © 1993 IEEE, 10 pages.
Kirk et al., *Noise Characterization of Weighting Schemes for Combination of Multiple Exposures*, BMVC 2006 doi: 10.5244/C.20.115, 10 pages.
Mann et al., *On Being 'Undigital' with Digital Cameras: Extending Dynamic Range by Combining Differently Exposed Pictures*, MIT, 48$^{th}$ Annual Conference, May 1995, 7 pages.

* cited by examiner

FIGURE 9

BLENDING DEPTH IMAGES OBTAINED WITH MULTIPLE EXPOSURES

TECHNICAL FIELD OF THE DISCLOSURE

The present disclosure relates to the field of integrated circuits, in particular to extending dynamic range for time-of-flight depth imaging.

BACKGROUND

Depth imaging techniques are implemented in time-of-flight cameras and range finders. Depth imaging techniques can pulse light sources and measure reflected light to sense the presence, distance information, depth information, and/or speed information of an object. These optical systems have a wide range of uses, such as security systems, medical systems, automotive systems (e.g., for self-driving vehicles and/or driver assistance), aerospace systems, consumer electronic devices, industrial applications, gaming, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

To extend dynamic range, a depth imager can expose a scene with two different exposures to obtain two depths. The two different exposures are selected to have respective depth ranges that overlap each other. The two depths can be combined by taking into account the difference in exposures and where the two depths are located with respect to boundaries of an overlapping range of the two depth ranges. The combination of the two depths in this manner can help avoid image artifacts such as contouring.

Time-of-Flight Operations

Figure 1:
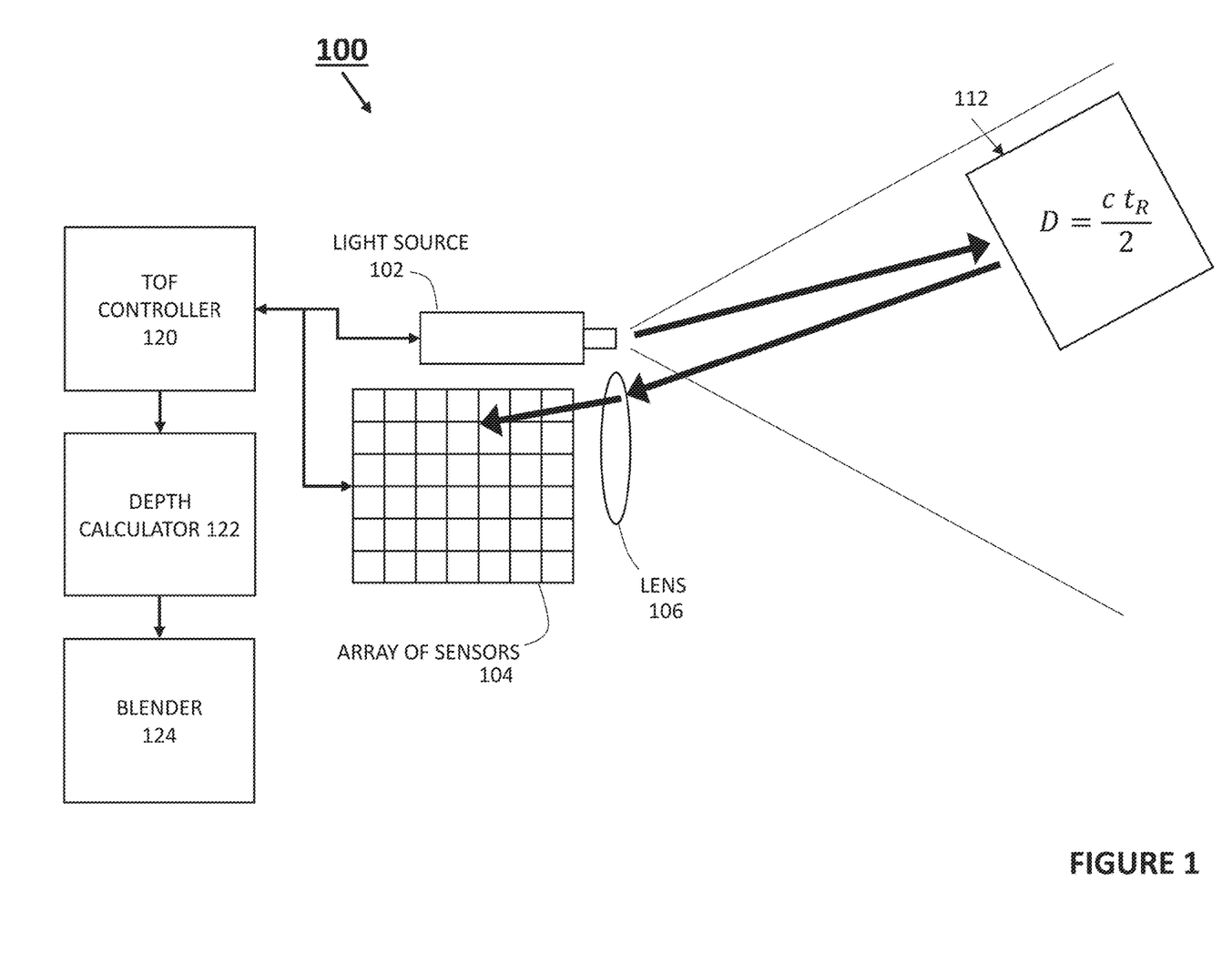
FIG. 1 illustrates a depth imager and associated time-of-flight operations, according to some embodiments of the disclosure.

FIG. 1 illustrates a depth imager and associated time-of-flight (TOF) operations, according to some embodiments of the disclosure. The depth imager includes light source 102 (e.g., one or more light emitting diodes, one or more lasers, etc.) for emitting light. The depth imager can include one or more sensors, depicted in the example in FIG. 1 as an array of sensors 104. A lens 106 can be included in front of the array of sensors. The scene may have a plurality of objects. For simplicity, one object 114 is shown. The array of sensors 104 can include charge-coupled device (CCD) sensors arranged over a two-dimensional area. The sensors in the array of sensors 104 are referred to as pixels.

The depth imager includes a TOF controller 120 for driving the light source 102 and the array of sensors 104. The depth imager may include circuitry for receiving and processing signals from the array of sensors 104. The array of sensors 104 can make light measurements and transmit the light measurements as signals to the TOF controller 120. Such depth imagers may also simultaneously output a regular image of the scene, such as a red-green-blue (RGB) image or infrared image.

The depth imager further includes a depth calculator 122 to derive depths from the light measurements. The depths calculated from the light measurements can form a depth image of a scene, where each pixel of a depth image represents a distance to the object in the field of view of that pixel. The following passages describe exemplary ways to calculate depth based on a set of light measurements made by a pixel in the array of sensors 104.

An example of a depth imaging technique for creating depth images is TOF imaging. TOF operates by having the light source 102 emit light onto the scene, called an exposure. The light source 102 can emit light pulses (e.g., a train of light pulses) to expose the scene. In some cases, the light source 102 is on for a duration of time to expose the scene. Light is then reflected off the objects (e.g., object 112) in the scene. Reflected light hits the array of sensors 104. The signals output from the array of sensors 104 can be used to calculate distance information and form a depth image.

Typically, a light source of a depth imager is close to (adjacent to) the array of sensors and moves along with the array of sensors if the array of sensors is mobile (e.g., the light source has a fixed position with respect to the array of sensors). For simplicity, the array of sensors is sometimes referred herein referred to as "sensor". In some other cases, one could consider a static light source as well, or any light source whose position is known over time. Referring to the case with the light source of a depth imager close to the sensor, it can be understood that the time it takes for the light to return and hit the sensor is proportional to the distance to the object. More precisely, the depth D of an object is given by the equation:

$$D = \frac{ct_R}{2} \qquad \text{(eq. 1)}$$

where c is the speed of light, $t_R$ is the time it takes for the light to return and hit the sensor.

The factor of 2 in equation (1) is due to the light having to go to the object and return. The factor can differ depending on the location of the light source relative to the sensor.

To obtain a depth for each pixel in the array of sensors 104, a set of measurements are carried out at each pixel. In practice, a pixel can have multiple charge storage units for collecting multiple light measurements, and thus multiple separate sensor signals can be used to control the charge storage units individually with different timings. A pixel can convert incoming photons into electrons and store those electrons in charge storage units. The charge storage units can be controlled individually with different sensor signals to achieve different sensor timings and make different measurements. For example, each pixel includes one or more photodiodes (or photosensitive element) for sensing photons and converting the photons into electrons and one or more capacitors for storing the electrons, acting as charge storage unit(s). Sensor signals can start and stop the collection of electrons by the capacitors with specified timings. The series of capacitors can be considered as memory elements, i.e., charge storage units, which store different collected light measurements. The amount of charge stored in the charge storage units of a pixel can be read by other circuitry and further processed by the other circuitry to compute depth. The set of measurements (i.e., charge stored in the charge storage units) provide information to compute a depth. Each pixel can enable a respective depth to be computed or estimated; the array of sensors 104 can enable a depth image to be generated based on the respective depths.

The emitted light bounces off the objects, and can return and hit the array of sensors 104. Besides the return light from the objects, the array of sensors 104 can further receive other extraneous light which may corrupt the TOF measurement. One form of extraneous light is background (BG) light. BG light may come from other sources such as sunlight, other light sources not associated with the system, and light sources associated with other depth imagers. It is desirable to design TOF depth imagers which have some tolerance for BG light. For some measurements, the collected signal can include BG light and return light reflected from an object hitting the pixel during the period of integration. With the proper set of measurements and computations, depth can be estimated from three light measurements based on a scheme that is tolerant to BG light. A pixel can include three charge storage units, $S_0$, $S_1$, and $S_2$, which can store different collected light measurements. The light source 102 can be on from times $t=0$ to $t=T_L$. $S_0$ can collect light from times $t=t_0$ to $t=t_0+T_L$. $S_1$ can collect light from times $t=t_1$ to $t=t_1+T_L$. In one case, $t_1=t_0+T_L$. $S_2$ can collect BG light for a time $T_L$ with the light source 102 off. The durations of the time interval where the pixel is sensing light for the three charge storage units do not necessarily have to be $T_L$ for all three measurements. A depth D for the pixel can be obtained by computing the following exemplary equation:

$$D = D_{min} + \frac{ct_R}{2} \frac{S_1 - S_2}{S_0 - S_2 + S_1 - S_2} \quad \text{(eq. 2)}$$

which is obtained when $t_0=t_1$, $$D_{min} = 2\frac{t_0}{c}.$$

$D_{min}$ is a minimum distance at which the depth imager reports depth. Generally speaking, a depth imager can have a depth range defined by the minimum distance $D_{min}$ and a maximum distance $D_{max}$. Outside of the depth range, the depth imager does not report distance. One reason for $D_{min}$ not being zero could be that the return light for objects of large reflectivity closer than $D_{min}$ is so strong that the return light saturates the array of sensors 104. $D_{max}$ is typically the distance beyond which not enough light returns to the array of sensors 104 (e.g., the collected measurement is too noisy) to determine the distance.

The collected light by $S_0$ and $S_1$ are individually adjusted for BG light by subtracting the BG light collected by $S_2$. The depth is computed based on the ratio of collected light by $S_1$ over the total amount of collected light by $S_0$ and $S_1$, after the adjustment for BG light $S_2$ is performed. Accordingly, the depth D computed with equation (2) and the described measurements has the advantage of being tolerant/insensitive to background light, since $S_2$ measuring BG light is subtracted from the measurements done by $S_0$ and $S_1$.

To take into account that light pulses and sensor signals are not perfectly square pulses, it is possible to measure the ratio $$\frac{S_1 - S_2}{S_0 - S_2 + S_1 - S_2}$$

as a function of depth and store the values in a lookup table. The lookup table implements a function H(x) such that $$H\left(\frac{S_1 - S_2}{S_0 - S_2 + S_1 - S_2}\right) = D$$

and allows the depth to be adjusted for the non-ideal pulse shapes. In other words, the result from the lookup table based on the ratio $$\frac{S_1 - S_2}{S_0 - S_2 + S_1 - S_2}$$

can output a corrected depth. Values for H(x) can be extrapolated between the values of x for which H(x) is known. The depth equation becomes:

$$D = H\left(\frac{S_1 - S_2}{S_0 - S_2 + S_1 - S_2}\right) \quad \text{(eq. 3)}$$

Dynamic Range Limitations of a Depth Imager

As mentioned previously, a depth imager has a depth range defined by the minimum distance $D_{min}$ and a maximum distance $D_{max}$. Outside of the depth range, the depth imager does not report distance. Typically, the depth range for a depth imager (e.g., a 3D infrared imaging system) is fixed due to the limitations of the given exposure level that the depth imager is using. While multiple measurements based on repeated (but same) exposures of the scene can increase signal strength, the dynamic range of the measurement remains substantially fixed.

Sometimes, it is desirable to find ways to extend the depth range substantially to accommodate scenes where objects can be at a large range of distances from the array of sensors. To extend the depth range (also referred to as the dynamic range of the depth imager), multiple exposures at different exposure levels of the scene can be used. Multiple sets of measurements at each pixel can be made from the multiple exposures to extend the dynamic range of the pixel. For simplicity, a set of measurement made from a given exposure is referred to in the following passages as "a measurement" (which can in practice include several light measurements at a pixel). Choosing the different exposures and combining the different measurements obtained from the different exposures are not trivial tasks.

Choosing Different Exposures to Extend the Dynamic Range of a Depth Imager

The exposures (i.e., the exposure levels) are chosen to be different to substantially extend the dynamic range of a depth imager. Moreover, the exposures have corresponding depth ranges that overlap to ensure the depth imager has a continuous extended depth range. Herein, an exposure can be defined by how long the light source is on, or how many pulses the light source is emitting. Different exposures would mean that the exposure level is different, e.g., the light source emits a different number of pulses.

Figure 2:
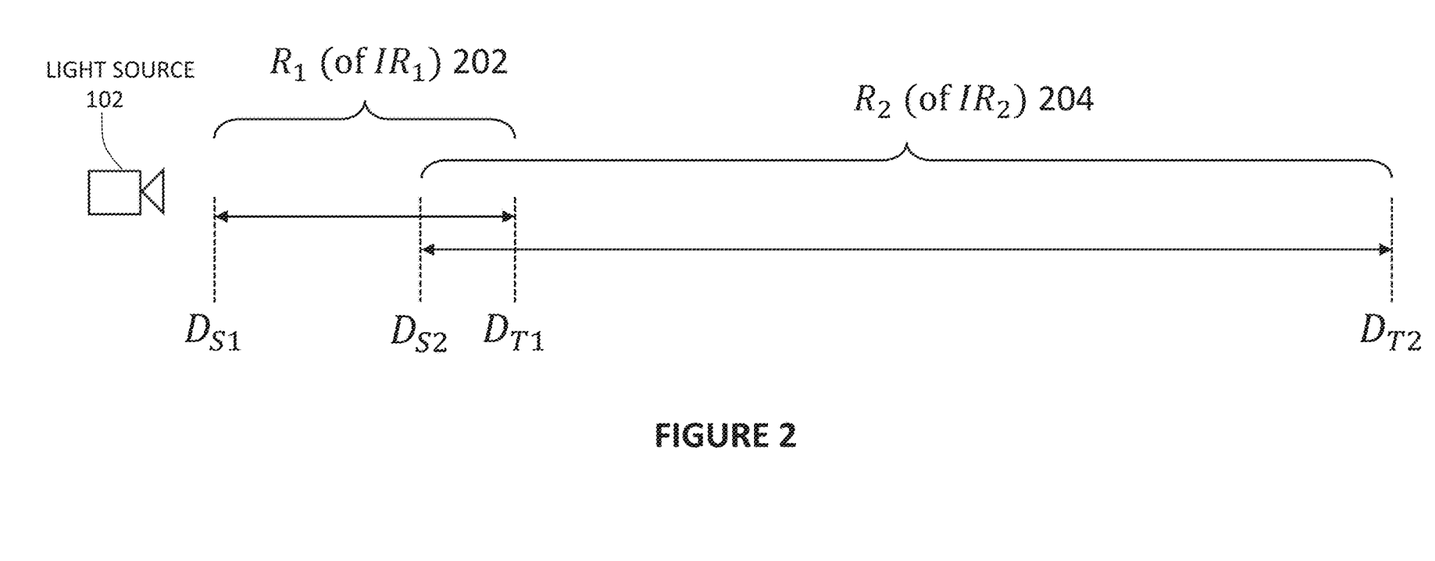
FIG. 2 illustrates depth ranges corresponding to two different exposures, according to some embodiments of the disclosure.

FIG. 2 illustrates depth ranges corresponding to two different exposures, according to some embodiments of the disclosure. The first exposure $IR_1$ has a corresponding first depth range $R_1$ 202. The second exposure $IR_2$ has a corresponding second depth range $R_2$ 204. The depth range for a given exposure level is determined by the distance $D_S$ at which the reflected light saturates the sensor, to the distance $D_T$ where the signal to noise ratio of the measured depth value is below a noise tolerance. $D_S$ is referred to as the saturation distance, where the amount of returned light over a short distance saturates the sensor. $D_T$ is referred to as the noise tolerance distance, where the amount of returned light is so low, and the signal is too noisy for a good depth to be calculated. Accordingly, the first depth range $R_1$ 202 for the first exposure $IR_1$ is defined as a range from a saturation distance $D_{S1}$ to a noise tolerance distance $D_{T1}$. The second depth range $R_2$ 204 for the second exposure $IR_2$ is defined as a range from a saturation distance $D_{S2}$ to a noise tolerance distance $D_{T2}$.

The ratio, $D_S/D_T$, is typically the same for different exposures since light intensity drops off at a rate of $1/D^2$ no matter the exposure level. The noise is a function of the infrared intensity, N(IR). The IR level at $D_S$, $IR_S$, is the maximum before saturating the sensor and the IR level at $D_T$, $IR_T$ decreases as the inverse of the distance squared: $IR_T = IR_S \times D_S/D_T^2$.

A first depth range $R_1$ 202 thus has depth limits $D_{S1}$ and $D_{T1}$, and a second depth range $R_2$ 204 has depth limits $D_{S2}$ and $D_{T1}$. The exposures are chosen such that a first depth range $R_1$ 202 corresponding to the first exposure $IR_1$ overlaps with the second depth range $R_2$ 204 corresponding to the second exposure $IR_2$. This means that the saturation distance $D_{S2}$ of the second exposure $IR_2$ is less than the noise tolerance distance $D_{T1}$ of the first exposure $IR_1$ ($D_{S2} < D_{T1}$), or the noise tolerance distance $D_{T1}$ of the first exposure $IR_1$ is greater than the saturation distance $D_{S2}$ of the second exposure $IR_2$ ($D_{T1} > D_{S2}$).

Combining Multiple Measurements from Multiple Exposures

When using multiple measurements from multiple exposure levels to increase dynamic range, the multiple measurements may report different depths for an object (at some actual distance), but each depth is still within some accuracy tolerance of the system. Therefore, when depths are being reported in the overlapping region of two depth ranges (e.g., a range defined from $D_{S2}$ to $D_{T1}$), image artifacts such as contouring may appear, if the measurements are not processed and combined appropriately.

To blend two depths resulting from different exposure levels or depth ranges, the depth for each pixel can be combined by using two weights when the depths are within the overlapping region of the two depth ranges, e.g., a first depth range $R_1$ 202 and a second depth range $R_2$ 204. A first weight can account for the difference in exposure levels. A second weight can account for the proximity of the depths to boundaries of the overlapping region. The combination of the two weights can yield blended results without image artifacts.

Referring back to FIG. 1, the depth imager further includes a blender 124, which takes depths calculated by depth calculator 122, and combines the depths to extend the dynamic range of the depth imager in a manner to avoid or reduce image artifacts.

Figure 3:
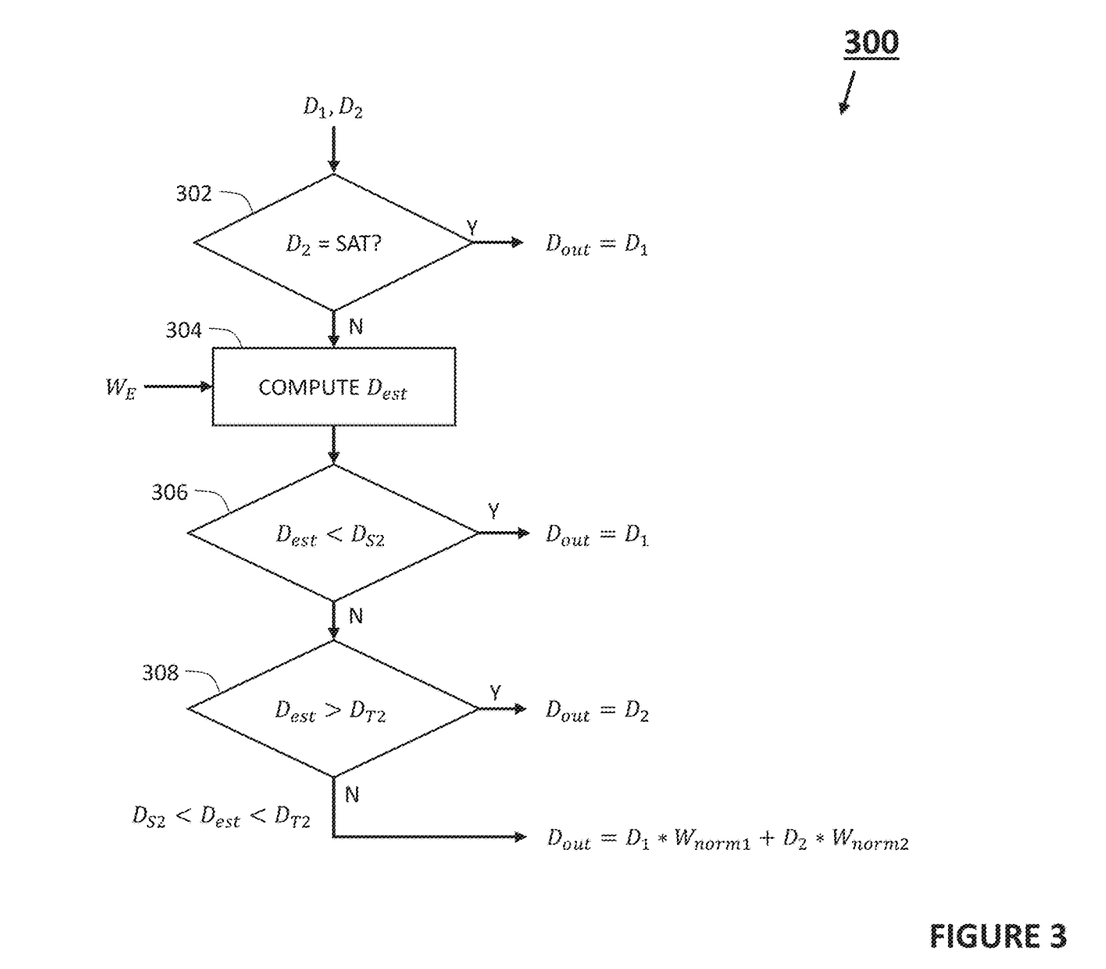
FIG. 3 illustrates a method for blending depth images obtained with multiple exposures, according to some embodiments of the disclosure.

FIG. 3 illustrates a method for blending depth images obtained with multiple exposures, according to some embodiments of the disclosure. The method can be performed by the depth imager of FIG. 1 to extend the dynamic range of the depth imager through multiple exposures. A depth imager makes a first exposure of a scene and a second exposure of a scene (e.g., using the TOF controller 120 of FIG. 1 to make the first exposure and the second exposure). The first exposure and the second exposure can be chosen as illustrated in FIG. 2, where the second exposure is different from the first exposure. A sensor (e.g., in the array of sensors 104) can make a first measurement (e.g., a set of light measurements) based on the first exposure $IR_1$ of a scene. The sensor can make a second measurement (e.g., a set of light measurements) based on the second exposure $IR_2$ of a scene. The first measurement and the second measurement done by the sensor can be transmitted to TOF controller 120 of FIG. 1.

A depth calculator (e.g., depth calculator 122 of FIG. 1) can determine a first depth $D_1$ based on the first measurement obtained from the first exposure $IR_1$ of the scene. The depth calculator can also determine a second depth $D_2$ based on the second measurement obtained from the second exposure $IR_2$ of the scene. The first depth $D_1$, and the second depth $D_2$ can be provided to blender 124 for processing.

Blender 124 of FIG. 1 takes the first depth $D_1$, and the second depth $D_2$ as inputs. Blender 124 also receives parameters such as exposure levels for the first exposure and the second exposure (e.g., $IR_1$ and $IR_2$) and depth ranges for the first exposure and the second exposure (e.g., depth limits $D_{S1}$, $D_{T1}$, $D_{S2}$, and $D_{T1}$). Blender 124 produces an adjusted depth $D_{out}$ as the final depth which combines the first depth $D_1$ and the second depth $D_2$.

Optionally, in 302, blender 124 determines whether the second depth $D_2$ indicates saturation. In some cases, the second depth $D_2$ is zero, or has a value which indicates that the sensor is in saturation. In such a case, the blender 124, in response to determining that the second depth $D_2$ indicates saturation (following the "Y" branch), sets the first depth $D_1$ as the adjusted depth $D_{out}$. When the second depth $D_2$ indicates saturation, the first depth $D_1$ would be the most accurate depth that can be obtained. Accordingly, $D_{out} = D_1$.

In 304, blender 124 computes an estimated depth $D_{est}$ based on the first depth $D_1$, the second depth $D_2$, and a relationship between the first exposure $IR_1$ and the second exposure $IR_2$. The relationship between the first exposure $IR_1$ and the second exposure $IR_2$ is based on a ratio $E_R$ of the second exposure $IR_2$ and the first exposure $IR_1$. For example, $E_R = IR_2/IR_1$. The first exposure $IR_1$ and the second exposure $IR_2$ can be number of light pulses, or durations that the light source is on. The relationship can be captured by an exposure weight $W_E$ as a function of the ratio $E_R$, i.e., $W_E(E_R)$. In some cases, the relationship between the first exposure $IR_1$ and the second exposure $IR_2$ can define an exposure weight $W_E$ that weighs the second depth $D_2$ (obtained with the second exposure $IR_2$ having a higher exposure level) more than the first depth $D_1$ (obtained with the first exposure $IR_1$ having a lower exposure level).

To determine an estimated depth $D_{est}$, blender 124 can determine a weighted combination of the first depth $D_1$ and the second depth $D_2$ based on the relationship between the first exposure $IR_1$ and the second exposure $IR_2$. The exposure weight $W_E$ (and a complementary exposure weight $(1-W_E)$) can be used for computing the weighted combination of the first depth $D_1$ and the second depth $D_2$, and the blender 124 can use the weighted combination as the estimated depth $D_{est}$. For instance, the estimated depth $D_{est}$ can be computed by:

$$D_{est}=W_E \cdot D_1+(1-W_E) \cdot D_2 \quad \text{(eq. 101)}$$

The exposure weight $W_E$ can be computed by:

$$W_E(E_R) = \frac{1}{1+E_R} \quad \text{(eq. 102)}$$

In some cases, the exposure weight $W_E$ is a value between 0 and 1. In some cases, the value of the exposure weight $W_E$ is set to a value to ensure that the first depth $D_1$ and the second depth $D_2$ are weighted proportionally to the level of the first exposure $IR_1$ and the second exposure $IR_2$ respectively. The exposure weight $W_E$ can be defined based on known settings of the first exposure $IR_1$ and the second exposure $IR_2$. In some cases, the exposure weight $W_E$ can be defined based on sensor measurements that are representative of exposure levels of the first exposure and the second exposure $IR_2$.

The intuition behind the exposure weight $W_E$ is that the depth obtained with a higher exposure (associated with higher signal strength) is considered to be better than the depth obtained with a lower exposure (associated with lower signal strength). As a result, the exposure weight $W_E$ weights the depth obtained with the higher exposure more than the depth obtained with the lower exposure. Since the depth obtained with the lower exposure still has some information about the true/actual depth, the depth obtained with the higher exposure and the depth obtained with the lower exposure are combined together to form an estimated depth using the exposure weight $W_E$.

In 306, blender 124 determines whether the estimated depth $D_{est}$ is less than the saturation distance $D_{S2}$ of the second exposure $IR_2$. This checks to see if the second depth $D_2$ is likely to be in saturation (and the first depth $D_1$ is likely to be a more accurate depth than $D_2$). In other words, blender 124 checks whether $D_{est} < D_{S2}$ is true. If yes (following the "Y" branch), the first depth $D_1$ is set as the adjusted depth $D_{out}$. When the second depth $D_2$ is likely to be saturated, the first depth $D_1$ would be the most accurate depth that can be obtained. Accordingly, $D_{out}=D_1$. If no (following the "N" branch), the method proceeds to 308.

In 308, blender 124 determines whether the estimated depth $D_{est}$ is greater than the noise tolerance distance $D_{T1}$ of the first exposure $IR_1$. This checks to see if the first depth $D_1$ likely too noisy (and the second depth $D_2$ is likely to be a more accurate depth than $D_1$). In other words, blender 124 checks whether $D_{est} > D_{T1}$ is true. If yes (following the "Y" branch), the second depth $D_2$ is set as the adjusted depth $D_{out}$. When the first depth $D_1$ is likely to be too noisy, the second depth $D_2$ would be the most accurate depth that can be obtained. Accordingly, $D_{out}=D_2$.

If no (following the "N" branch from 308), it is determined that the estimated depth $D_{est}$ is greater than the saturation distance $D_{S2}$ of the second exposure $IR_2$ and the estimated depth $D_{est}$ is less than the noise tolerance distance $D_{T1}$ of the first exposure $IR_1$. In other words, the estimated depth $D_{est}$ is in the overlapping region of the first depth range $R_1$ and the second depth range $R_2$. The method proceeds to set the adjust depth $D_{out}$ based on a combined weight. The combined weight is a combination of two weights: an exposure weight $W_E(E_R)$ and an interpolation weight $W_P(D_{est})$. The use of the combined weight can smooth out any image artifacts which might occur at the boundaries of the overlapping region. The combined weight is determined based on the relationship between the first exposure and the second exposure (e.g., $W_E(E_R)$) and an interpolation weight (e.g., $W_P(D_{est})$).

An interpolation weight is defined by the estimated depth $D_{est}$, the saturation distance $D_{S2}$ of the second exposure $IR_2$, and the noise tolerance distance $D_{T1}$ of the first exposure $IR_1$. For example, the interpolation weight (e.g., $W_P(D_{est})$) can depend on a proximity or distance of the estimated depth $D_{est}$ to the noise tolerance distance $D_{T1}$ of the first exposure $IR_1$ or the saturation distance $D_{S2}$ of the second exposure $IR_2$. In some cases, interpolation weight $W_P$ can be computed by:

$$W_P(D_{est}) = \frac{D_{T1} - D_{est}}{D_{T1} - D_{S2}} \quad \text{(eq. 103)}$$

In other words, the interpolation weight (e.g., $W_P(D_{est})$) is a ratio of (1) a distance between the estimated depth $D_{est}$ to the noise tolerance distance $D_{T1}$ of the first exposure $IR_1$ (e.g., $D_{T1}-D_{est}$) and (2) the width of the overlapping region (e.g., $D_{T1}-D_{S2}$). The interpolation weight $W_P$ thus measures how close the estimated depth $D_{est}$ is to the boundaries of the overlapping region of the first depth range $R_1$ and the second depth range $R_2$. The calculation in equation (103) is based on linear interpolation, but it is envisioned that the calculation for the interpolation weight $W_P$ can be based on other interpolation schemes. The interpolation weight $W_P$ enables smooth (linear) interpolation within this overlapping region and avoids discontinuities at the boundaries of the overlapping region.

Once the interpolation weight $W_P$ (and a complementary interpolation weight $(1-W_P)$) is computed, it is possible to combine the exposure weight $W_E(E_R)$ and the interpolation weight $W_P(D_{est})$ into a combined weight $W_1$. The combined weight $W_1$ can be a product of the exposure weight $W_E$ and the interpolation weight $W_P$:

$$W_1=W_E \cdot W_P \quad \text{(eq. 104)}$$

A complementary combined weight $W_2$ can be a product of complementary exposure weight $(1-W_E)$ and the complementary interpolation weight $(1-W_P)$:

$$W_2=(1-W_E)(1-W_P). \quad \text{(eq. 105)}$$

Preferably, the combined weight $W_1$ and the complementary combined weight $W_2$ are normalized, so that the normalized combined weight $W_{Norm1}$ and the complementary normalized combined weight $W_{Norm2}$ add up to 1. The normalized combined weight $W_{Norm1}$ can be defined as a ratio of the combined weight $W_1$ and a sum of the combined weight $W_1$ and the complementary combined weight $W_2$:

$$W_{Norm1} = \frac{W_1}{W_1 + W_2} \quad \text{(eq. 106)}$$

The complementary normalized combined weight $W_{Norm2}$ can be defined as a ratio of the complementary combined weight $W_2$ and a sum of the combined weight $W_1$ and the complementary combined weight $W_2$:

$$W_{Norm2} = 1 - W_{Norm1} = \frac{W_2}{W_1 + W_2} \quad \text{(eq. 107)}$$

Expanding equations (106) and (107), the normalized combined weight $W_{Norm1}$ can be defined as:

$$W_{Norm1} = \frac{W_E \cdot W_P}{(W_E \cdot W_P + (1 - W_E) \cdot (1 - W_P))} \quad \text{(eq. 108)}$$

The complementary normalized combined weight $W_{Norm2}$ can be defined as:

$$W_{Norm2} = 1 - W_{Norm1} \quad \text{(eq. 109)}$$

Using the (normalized) combined weight, blender 124 can compute the adjusted depth $D_{out}$ by computing a weighted combination of the first depth $D_1$ and the second depth $D_2$ based on the (normalized) combined weight $W_1$ or $W_{norm1}$ (and a complementary version thereof), and setting the weighted combination/average of the first depth $D_1$ and the second depth $D_2$ as the adjusted depth $D_{out}$. Accordingly:

$$D_{out} = D_1 * W_{norm1} + D_2 * W_{norm2} \quad \text{(eq. 110)}$$

306 and 308 of FIG. 3 capture how the blender 124 can compute an adjusted depth $D_{out}$ based on the estimated depth $D_{est}$, the relationship between the first exposure and the second exposure (e.g., $W_E(E_R)$), a saturation distance $D_{S2}$ of the second exposure $IR_2$, and a noise tolerance distance $D_{T1}$ of the first exposure $IR_1$.

Exemplary Depth Imagers with Extended Dynamic Range

In one example, a depth imager with extended dynamic range, includes a TOF controller (e.g., TOF controller 120) to control a light source (e.g., light source 102) and one or more sensors (e.g., array of sensors 104) to make a first measurement based on a first exposure of a scene and a second measurement based on a second exposure of the scene different from the first exposure. Exemplary first and second measurements are illustrated in FIG. 2. The TOF controller can control the light source to emit a first number of light pulses for the first exposure, and controls the light source to emit a second number of light pulses for the second exposure.

The depth imager further includes a depth calculator (e.g., depth calculator 122) to calculate a first depth based on the first measurement and a second depth based on the second measurement. For instance, the first depth $D_1$ and the second depth $D_2$ can be calculated based on sensor measurements obtained through a first exposure $IR_1$ and a second exposure $IR_2$.

The depth imager further includes a blender (e.g., blender 124) to compute an estimated depth based on the first depth and the second depth. In some cases, the exposure weight is based on a ratio of the second number of pulses and the first number of pulses. An estimated depth can be computed based on 304 of FIG. 3. The blender can compute the estimated depth by calculating on an average of the first depth and the second depth weighted by the exposure weight. Equations (101) and (102) can be used for computing an exposure weight and an estimated depth.

The blender also outputs an adjusted depth based on the first depth, the second depth, an exposure weight relating the first exposure and the second exposure, and an interpolation weight computed based on the estimated depth. The adjusted depth can be computed based on 306 and 308 of FIG. 3. The blender outputs the first depth as the adjusted depth if the estimated depth is less than a saturation distance of the second exposure (306 of FIG. 3 and following the "Y" branch of 306). The blender outputs the second depth as the adjusted depth if the estimated depth is greater than a noise tolerance distance of the first exposure (308 of FIG. 3 and following the "Y" branch of 308). The blender outputs an average of the first depth and the second depth as the adjusted depth if the estimated depth is between a saturation distance of the second exposure and a noise tolerance distance of the first exposure, wherein the average is weighted by the exposure weight and the interpolation weight (following the "N" branch of 308). Equations (103)-(110) can be used to compute the adjusted depth.

In another example, a depth imager with extended dynamic range can include means for making a first measurement from exposing a scene with a first number of light pulses and a second measurement from exposing the scene with a second number of light pulses. The means can include TOF controller 120, light source 102, and array of sensors 104 of FIG. 1. The depth imager can further include means for determining a first depth from the first measurement and a second depth from the second measurement. The means can include depth calculator 122 of FIG. 1. The depth imager can further include means for blending the first depth and the second depth with a combination of (1) an exposure weight relating the first number of light pulses and the second number of light pulses and (2) an interpolation weight. The means can include blender 124 of FIG. 1, circuits which can implement parts of FIG. 3.

The present disclosure includes apparatuses which can include means to implement any one or more parts of the various techniques disclosed herein. Moreover, the present disclosure includes apparatuses including one or more processors, one or more memories for storing instructions. The one or more processors can execute the instructions to carry out any one or more parts of the various techniques disclosed herein (e.g., functionalities seen in FIG. 3).

A First Example

Suppose the ratio $E_R$ of the second exposure $IR_2$ and the first exposure $IR_1$ is 4, the saturation distance $D_{S2}$ of the second exposure $IR_2$ is 80 cm, the noise tolerance distance $D_{T1}$ of the first exposure $IR_1$ is 100 cm. A first depth $D_1$ is 84 cm. A second depth $D_2$ is 90 cm. The exposure weight $W_E$, based on equation (102) is thus 0.2. The estimated depth $D_{est}$ based on equation (101) is thus $0.2*84+0.8*90=88.8$ cm. The interpolation weight $W_P$ based on equation (103) is thus $(100-88.8)/(100-80)=0.56$. The normalized combined weight $W_{Norm1}$ based on equation (108) is thus 0.241, and the complementary normalized combined weight $W_{Norm2}$ based on equation (109) is thus 0.759. The adjusted depth based on equation (110) is thus $0.241*84+0.759*90=88.6$ cm.

Figure 4:
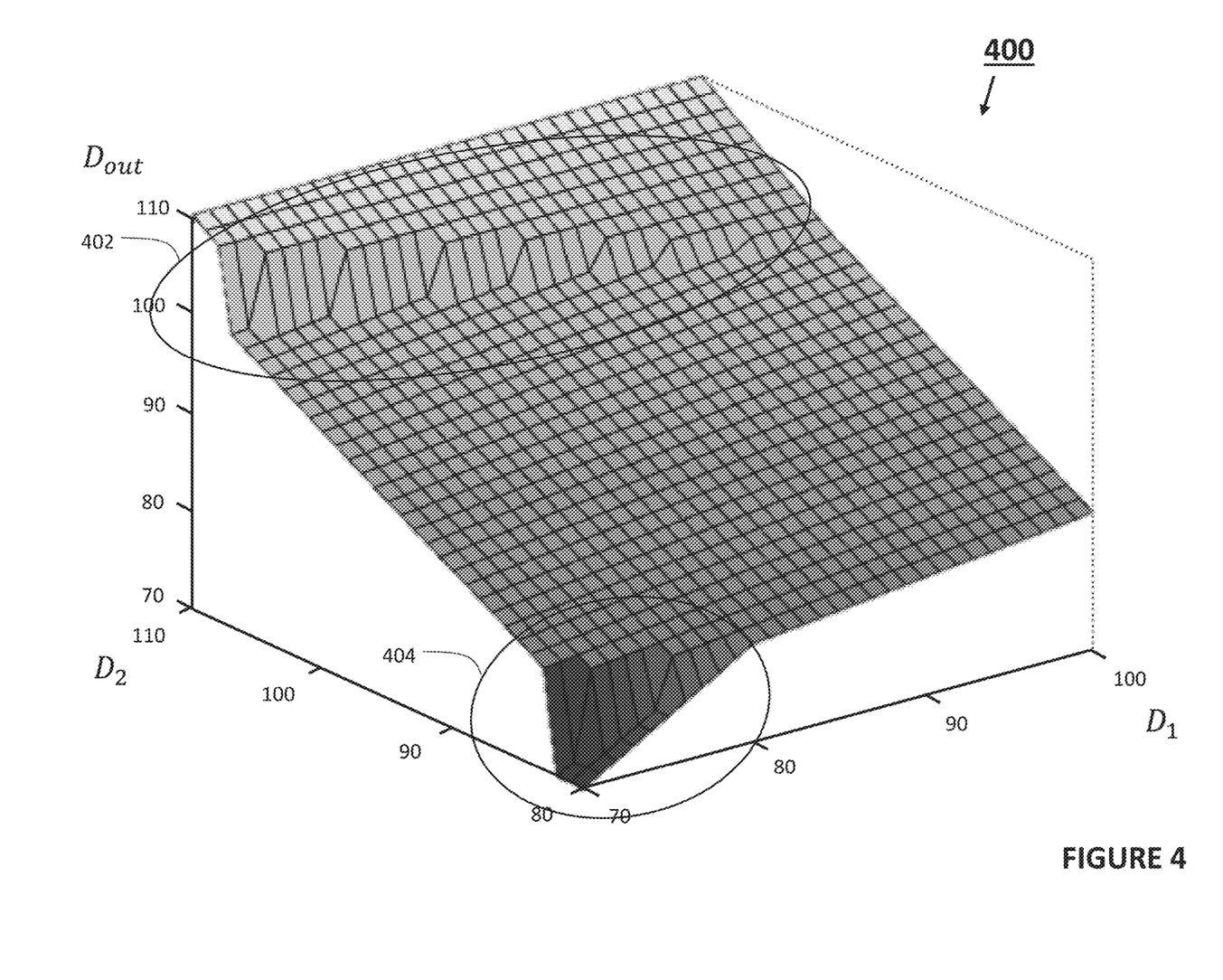
FIG. 4 shows results of blending based on only the exposure weight of a first example, according to some embodiments of the disclosure.
Figure 5:
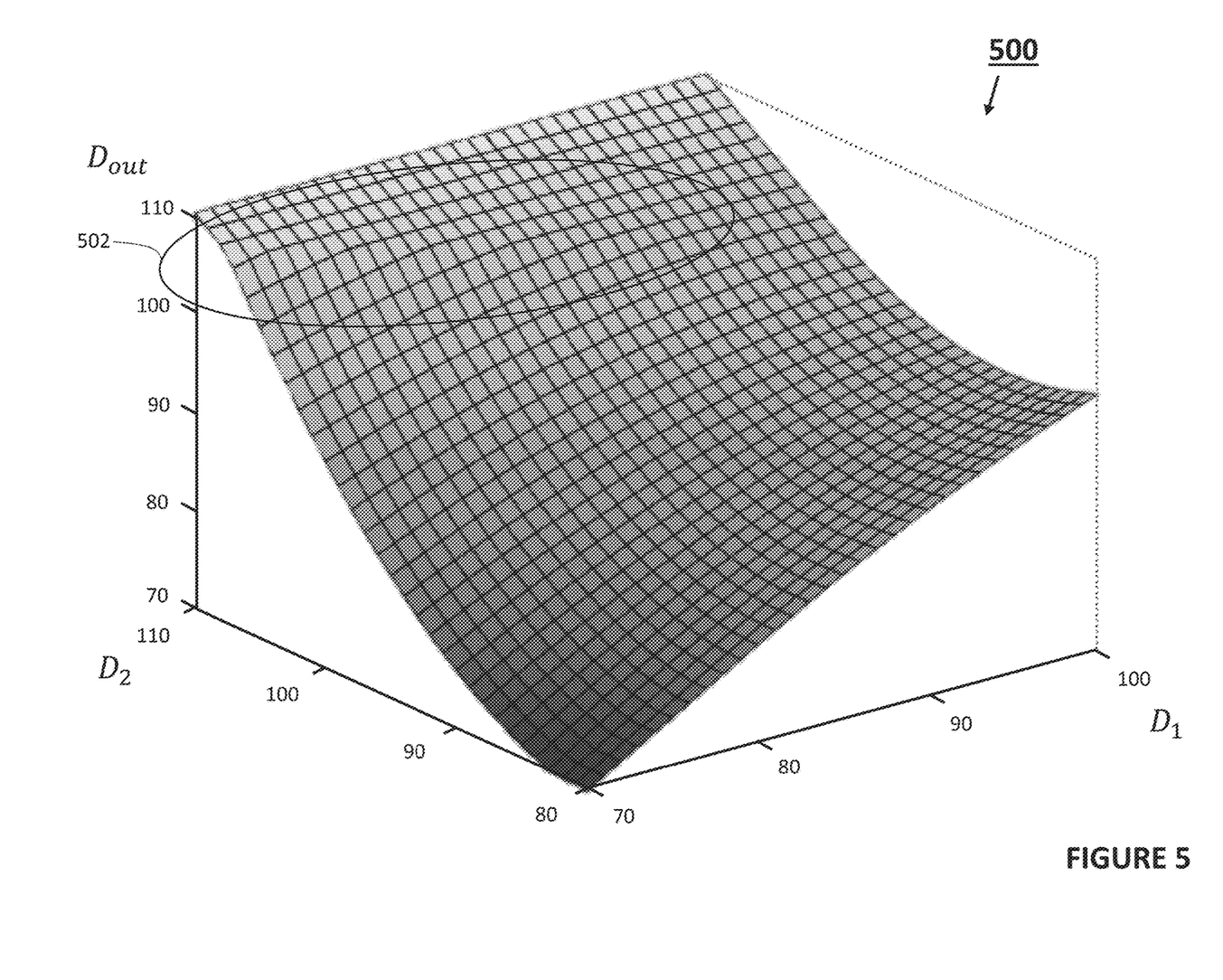
FIG. 5 shows results of blending based on only the interpolation weights of first example, according to some embodiments of the disclosure.
Figure 6:
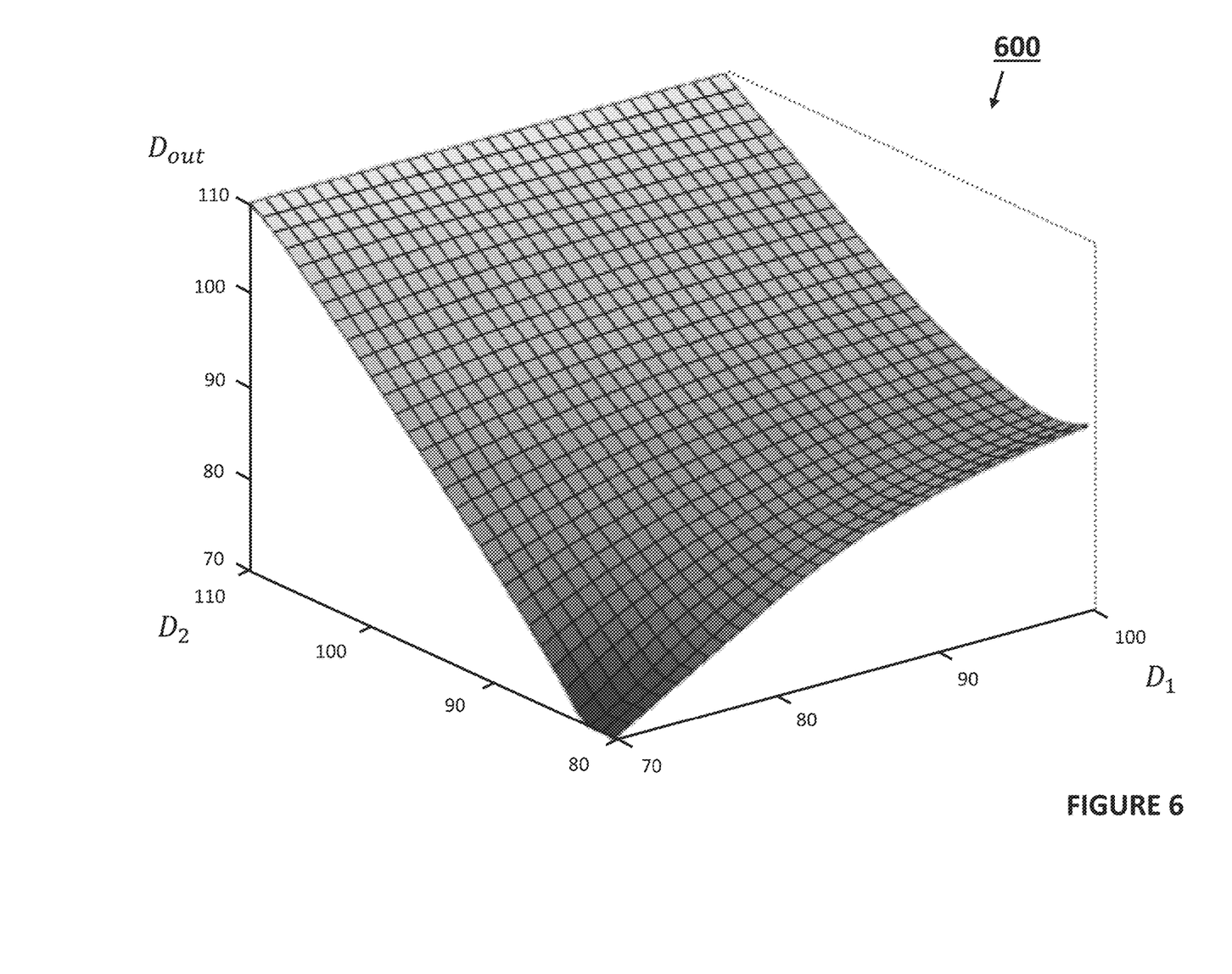
FIG. 6 shows results of blending based on both the exposure weight and interpolation weights of the first example, according to some embodiments of the disclosure.

FIG. 4 shows results of blending based on only the exposure weight of the first example, according to some embodiments of the disclosure. Regions 402 and 404 show sharp transitions in the final depth $D_{out}$, which would result in depth image artifacts. FIG. 5 shows results of blending based on only the interpolation weights of the first example, according to some embodiments of the disclosure. Region 502 shows sharp transitions in the final depth $D_{out}$, which would also result in depth image artifacts. FIG. 6 shows results of blending based on both the exposure weight and the interpolation weights of the first example, according to some embodiments of the disclosure. The results are obtained based on the scheme illustrated by FIG. 3 using blender 124 of FIG. 1. No sharp transitions appear in the adjusted depth $D_{out}$ over various first depth $D_1$ and second depth $D_2$ values. Accordingly, resulting depth images generated do not suffer from contouring or image artifacts caused by discontinuities at the boundaries of the overlapping region of two depth ranges.

A Second Example

Suppose the ratio $E_R$ of the second exposure $IR_2$ and the first exposure $IR_1$ is 5, the saturation distance $D_{S2}$ of the second exposure $IR_2$ is 80 cm, the noise tolerance distance $D_{T1}$ of the first exposure $IR_1$ is 120 cm. A first depth $D_1$ is 110 cm. A second depth $D_2$ is 92 cm. The exposure weight $W_E$, based on equation (102) is thus 0.167. The estimated depth $D_{est}$ based on equation (101) is thus 0.167*110+ 0.833*92=95 cm. The interpolation weight $W_P$ based on equation (103) is thus (120−95)/(120−80)=0.625. The normalized combined weight $W_{Norm1}$ based on equation (108) is thus 0.25, and the complementary normalized combined weight $W_{Norm2}$ based on equation (109) is thus 0.75. The adjusted depth based on equation (110) is thus 0.25*110+ 0.75*92=96.5 cm.

Figure 7:
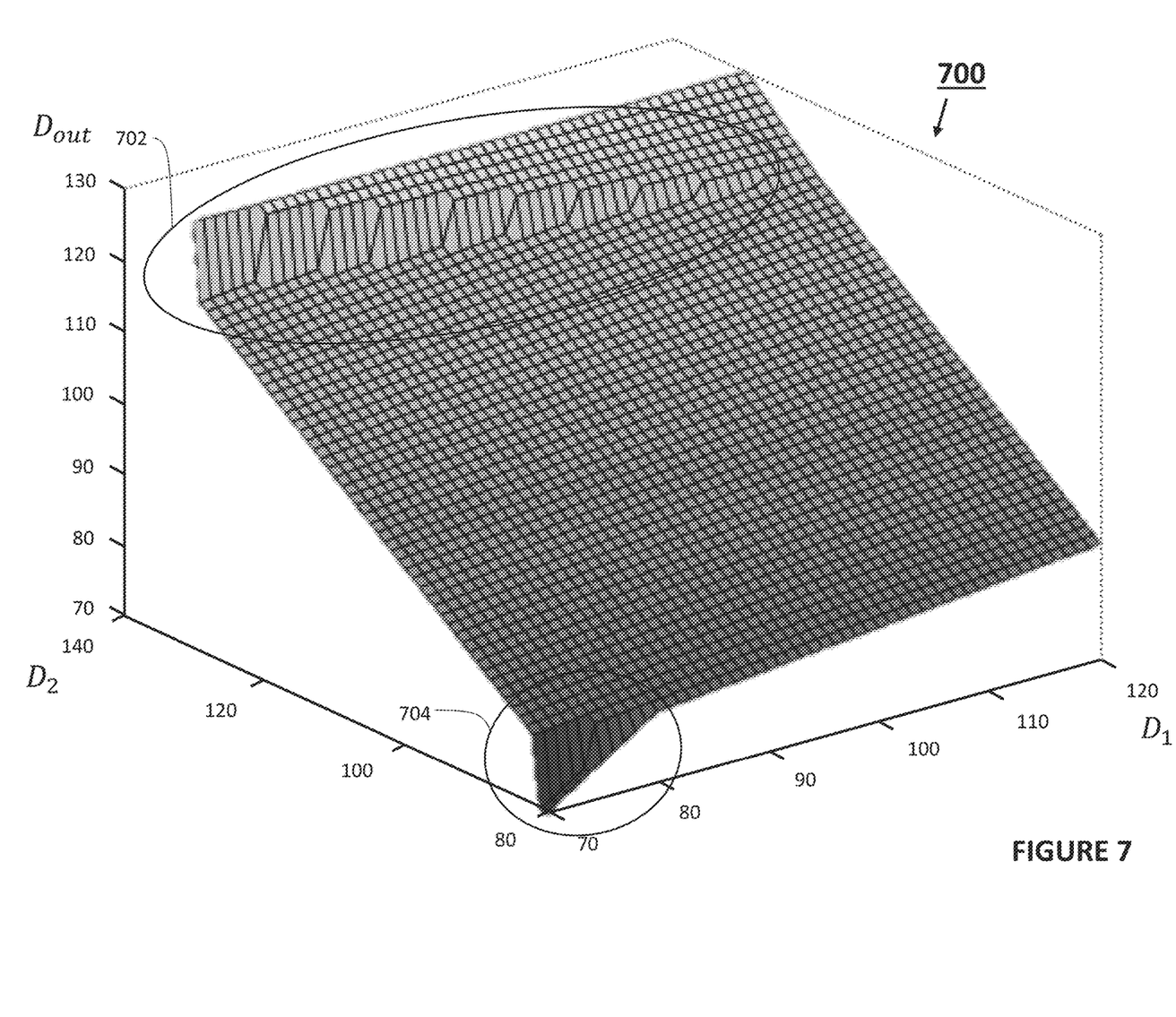
FIG. 7 shows results of blending based on only the exposure weight for a second example, according to some embodiments of the disclosure.
Figure 8:
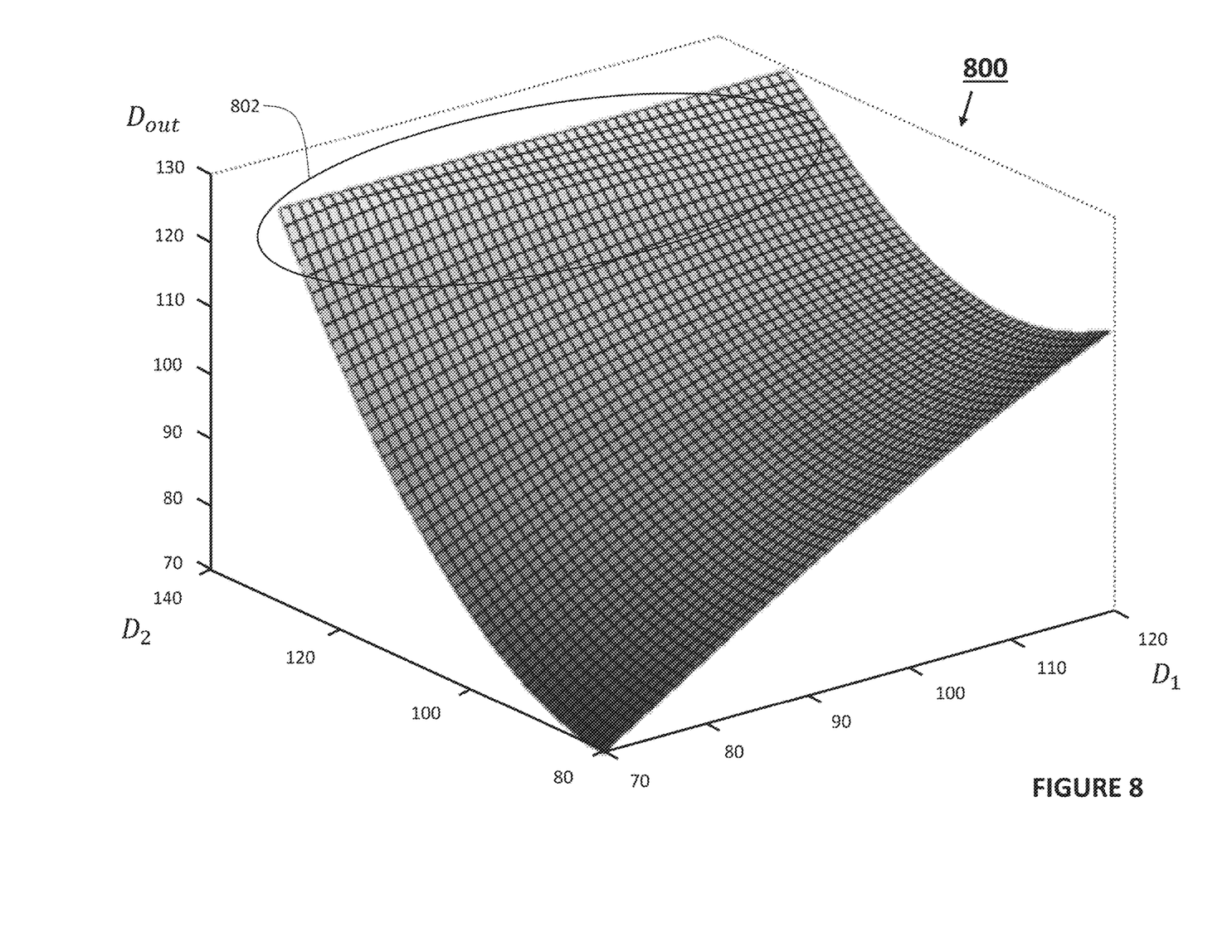
FIG. 8 shows results of blending based on only the interpolation weights of the second example, according to some embodiments of the disclosure.
Figure 9:
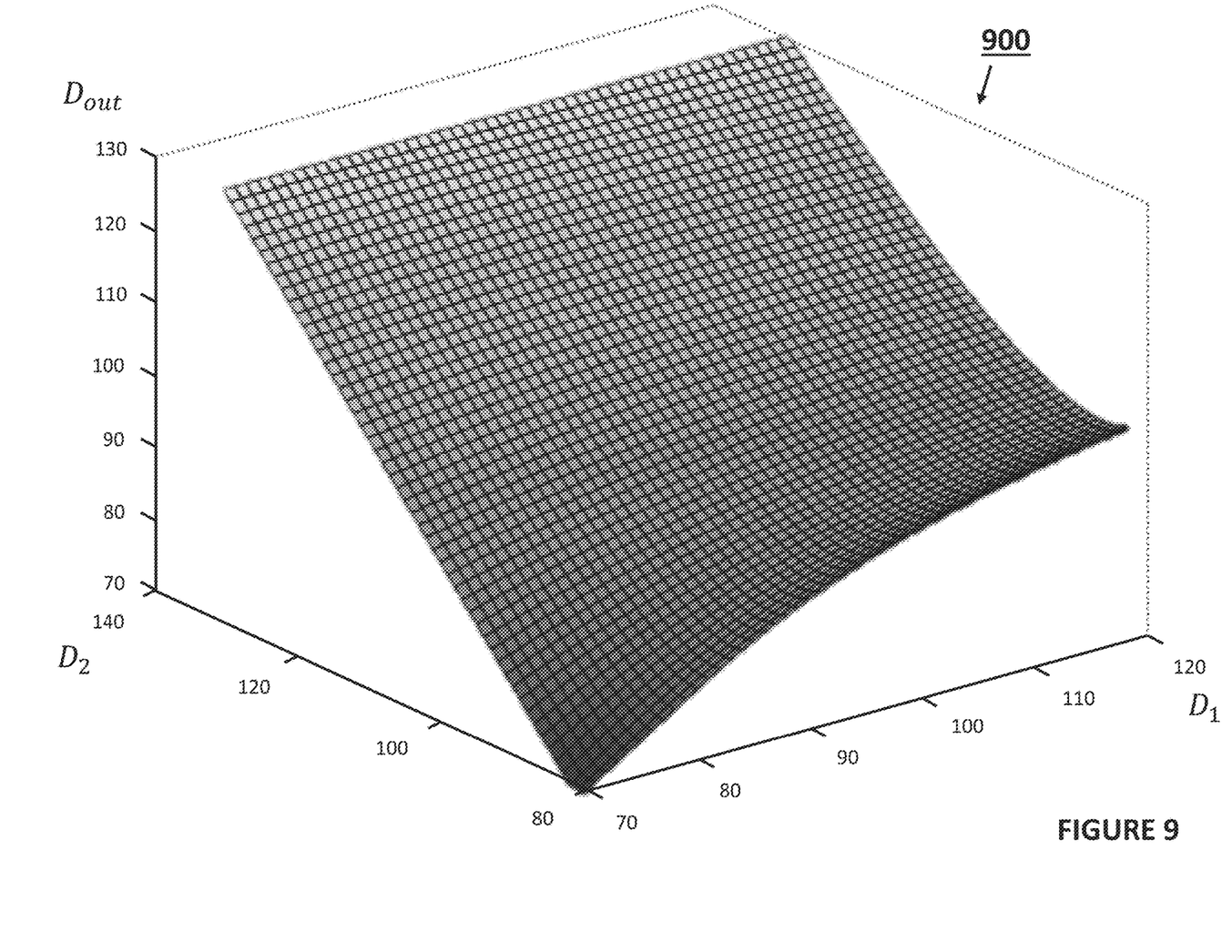
FIG. 9 shows results of blending based on both the exposure weight and interpolation weights of the second example, according to some embodiments of the disclosure.

FIG. 7 shows results of blending based on only the exposure weight of the second example, according to some embodiments of the disclosure. Regions 702 and 704 show sharp transitions in the final depth $D_{out}$, which would result in depth image artifacts. FIG. 8 shows results of blending based on only the interpolation weights of the second example, according to some embodiments of the disclosure. Region 802 shows sharp transitions in the final depth $D_{out}$, which would also result in depth image artifacts. FIG. 9 shows results of blending based on both the exposure weight and the interpolation weights of the second example, according to some embodiments of the disclosure. The results are obtained based on the scheme illustrated by FIG. 3 using blender 124 of FIG. 1. No sharp transitions appear in the adjusted depth $D_{out}$ over various first depth $D_1$ and second depth $D_2$ values. Accordingly, resulting depth images generated do not suffer from contouring or image artifacts caused by discontinuities at the boundaries of the overlapping region of two depth ranges.

Variations, Advantages, Applications, and Examples

Example 1 is a method for extending dynamic range of a depth imager through multiple exposures, the method comprising: determining a first depth obtained from a first exposure of a scene; determining a second depth obtained from a second exposure of the scene, wherein the second exposure is different from the first exposure; computing an estimated depth based on the first depth, the second depth, and a relationship between the first exposure and the second exposure; and computing an adjusted depth based on the estimated depth, the relationship between the first exposure and the second exposure, a saturation distance of the second exposure, and a noise tolerance distance of the first exposure.

In Example 2, Example 1 can optionally include a first depth range corresponding to the first exposure overlapping with a second depth range corresponding to the second exposure.

In Example 3, Example 1 or 2 can optionally include the saturation distance of the second exposure being less than the noise tolerance distance of the first exposure.

In Example 4, any one of Examples 1-3 can optionally include the relationship between the first exposure and the second exposure being based on a ratio of the second exposure and the first exposure.

In Example 5, any one of Examples 1-4 can optionally include the relationship between the first exposure and the second exposure defining an exposure weight that weighs the second depth more than the first depth.

In Example 6, any one of Examples 1-5 can optionally include computing the estimated depth comprising: determining a weighted combination of the first depth and the second depth based on the relationship between the first exposure and the second exposure.

In Example 7, any one of Examples 1-6 can optionally include computing the adjusted depth comprising: in response to determining that the estimated depth is less than the saturation distance of the second exposure, setting the first depth as the adjusted depth.

In Example 8, any one of Examples 1-7 can optionally include computing the adjusted depth comprising: in response to determining that the estimated depth is greater than the noise tolerance distance of the first exposure, setting the second depth as the adjusted depth.

In Example 9, any one of Examples 1-8 can optionally include computing the adjusted depth comprising: determining a combined weight based on (1) the relationship between the first exposure and the second exposure and (2) an interpolation weight defined by the estimated depth, the saturation distance of the second exposure, and the noise tolerance distance of the first exposure.

In Example 10, Example 9 can optionally include the interpolation weight depending on a proximity of the estimated depth to the noise tolerance distance of the first exposure or the saturation distance of the second exposure.

In Example 11, Example 9 or 10 can optionally include computing the adjusted depth comprising: computing a weighted combination of the first depth and the second depth based on the combined weight; and setting the weighted combination of the first depth and the second depth as the adjusted depth.

In Example 12, any one of Examples 1-11 can optionally include: in response to determining that the second depth indicates saturation, setting the first depth as the adjusted depth.

Example 13 is a depth imager with extended dynamic range, the depth imager comprising: a time-of-flight controller to control a light source and one or more sensors to make a first measurement based on a first exposure of a scene and a second measurement based on a second exposure of the scene different from the first exposure; a depth calculator to calculate a first depth based on the first measurement and a second depth based on the second measurement; and a blender to: compute an estimated depth based on the first depth and the second depth; and output an adjusted depth based on the first depth, the second depth, an exposure weight relating the first exposure and the second exposure, and an interpolation weight computed based on the estimated depth.

In Example 14, Example 13 can optionally include the time-of-flight controller controlling the light source to emit a first number of light pulses for the first exposure, and controls the light source to emit a second number of light pulses for the second exposure.

In Example 15, Example 14 can optionally include the exposure weight is based on a ratio of the second number and the first number.

In Example 16, any one of Examples 13-15 can optionally include the blender computing the estimated depth by calculating on an average of the first depth and the second depth weighted by the exposure weight.

In Example 17, any one of Examples 13-16 can optionally include the blender outputting the first depth as the adjusted depth if the estimated depth is less than a saturation distance of the second exposure.

In Example 18, any one of Examples 13-17 can optionally include the blender outputting the second depth as the adjusted depth if the estimated depth is greater than a noise tolerance distance of the first exposure.

In Example 19, any one of Examples 13-18 can optionally include the blender outputting an average of the first depth and the second depth as the adjusted depth if the estimated depth is between a saturation distance of the second exposure and a noise tolerance distance of the first exposure, wherein the average is weighted by the exposure weight and the interpolation weight.

Example 20 is a depth imager with extended dynamic range, the depth imager comprising: means for making a first measurement from exposing a scene with a first number of light pulses and a second measurement from exposing the scene with a second number of light pulses; means for determining a first depth from the first measurement and a second depth from the second measurement; and means for blending the first depth and the second depth with a combination of (1) an exposure weight relating the first number of light pulses and the second number of light pulses and (2) an interpolation weight.

Generally speaking, the embodiments disclosed herein are applicable to depth imagers which can benefit from having an extended dynamic range. Multiple exposures can be used to drastically increase dynamic range at a cost of a lower frame rate. A depth imager can be configured with different modes corresponding to different dynamic ranges to allow a user to trade frame rate for increased dynamic range. The mode can also be selected/chosen based on the desired application.

Depth imagers for determining depth, distance, and/or speed, which can benefit from an extended dynamic range, can be found in many applications, including optical systems, range finding systems, sports electronics, consumer electronics, medical equipment, aerospace/military equipment, automotive electronics, security systems, industrial systems, etc. The depth imager can be used in consumer products such as cell phones, augmented reality products, virtual reality products, gaming devices, etc.

The depth imagers mentioned herein can implement continuous-wave range finding techniques (which emit amplitude modulated light and distance information is extracted by comparing modulation phase of the received signal against the modulation phase of the emitted light) and pulsed time-of-flight range finding techniques (which emit a train of light pulses and measures the time interval between the emitted light and received light). These depth imagers tend to have similar dynamic range limitations. Making multiple exposures and blending the depths obtained from the multiple exposures can advantageously extend the dynamic range. The embodiments herein are generally applicable to range finding systems that derive depth by measuring reflected light resulting from emitted light, since these range finding systems typically exhibit the characteristic depth range limitations illustrated by FIG. 2.

In some cases, the depth imagers are radar based. In some other cases, the depth imagers are sonar based.

It is envisioned by the disclosure that more than two different exposures can be used, as long as the depth ranges of the exposures overlap with each other and provide an extended dynamic range. For example, one can use three different exposures, where a first depth range corresponding to the first exposure overlaps with a second depth range corresponding to a second exposure, and the second depth range overlaps with a third depth range corresponding to a third exposure.

The present disclosure includes apparatuses which can include means to implement any one or more parts of the various techniques disclosed herein.

It is also imperative to note that all of the specifications, dimensions, and relationships outlined herein (e.g., circuit components) have only been offered for purposes of example and teaching only. Such information may be varied considerably without departing from the spirit of the present disclosure, or the scope of the appended claims (if any) and/or examples. The specifications apply only to one non-limiting example and, accordingly, they should be construed as such. In the foregoing description, example embodiments have been described with reference to particular component arrangements. Various modifications and changes may be made to such embodiments without departing from the scope of the appended claims (if any) and/or examples. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to blending illustrate only some of the possible functions that may be carried out by the circuits illustrated in the FIGURES. Some of these operations may be deleted or removed where appropriate, or these operations may be modified or changed considerably without departing from the scope of the present disclosure. In addition, the timing of these operations may be altered considerably. The operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure. Note that all optional features of the apparatus described herein may also be implemented with respect to the method or process described herein and specifics in the examples may be used anywhere in one or more embodiments.

What is claimed is:

1. A method for extending dynamic range of a depth imager through multiple exposures, the method comprising:
    determining a first depth obtained from a first exposure of a scene;
    determining a second depth obtained from a second exposure of the scene, wherein the second exposure is different from the first exposure;
    computing an estimated depth based on the first depth, the second depth, and a relationship between the first exposure and the second exposure; and
    computing an adjusted depth based on the estimated depth, the relationship between the first exposure and the second exposure, a saturation distance of the second exposure, and a noise tolerance distance of the first exposure.

2. The method of claim 1, wherein a first depth range corresponding to the first exposure overlaps with a second depth range corresponding to the second exposure.

3. The method of claim 1, wherein:
    the saturation distance of the second exposure is less than the noise tolerance distance of the first exposure.

4. The method of claim 1, wherein:
    the relationship between the first exposure and the second exposure is based on a ratio of the second exposure and the first exposure.

5. The method of claim 1, wherein:
    the relationship between the first exposure and the second exposure defines an exposure weight that weighs the second depth more than the first depth.

6. The method of claim 1, wherein computing the estimated depth comprises:
    determining a weighted combination of the first depth and the second depth based on the relationship between the first exposure and the second exposure.

7. The method of claim 1, wherein computing the adjusted depth comprises:
    in response to determining that the estimated depth is less than the saturation distance of the second exposure, setting the first depth as the adjusted depth.

8. The method of claim 1, wherein computing the adjusted depth comprises:
    in response to determining that the estimated depth is greater than the noise tolerance distance of the first exposure, setting the second depth as the adjusted depth.

9. The method of claim 1, wherein computing the adjusted depth comprises:
    determining a combined weight based on (1) the relationship between the first exposure and the second exposure, and (2) an interpolation weight defined by the estimated depth, the saturation distance of the second exposure, and the noise tolerance distance of the first exposure.

10. The method of claim 9, wherein:
    the interpolation weight depends on a proximity of the estimated depth to the noise tolerance distance of the first exposure or the saturation distance of the second exposure.

11. The method of claim 9, wherein computing the adjusted depth comprises:
    computing a weighted combination of the first depth and the second depth based on the combined weight; and
    setting the weighted combination of the first depth and the second depth as the adjusted depth.

12. The method of claim 1, further comprising:
    in response to determining that the second depth indicates saturation, setting the first depth as the adjusted depth.

13. A depth imager with extended dynamic range, the depth imager comprising:
    a time-of-flight controller to control a light source and one or more sensors to make a first measurement based on a first exposure of a scene and a second measurement based on a second exposure of the scene different from the first exposure;
    a depth calculator to calculate a first depth based on the first measurement and a second depth based on the second measurement; and
    a blender to:
        compute an estimated depth based on the first depth and the second depth; and
        output an adjusted depth based on the first depth, the second depth, an exposure weight relating the first exposure and the second exposure, and an interpolation weight computed based on the estimated depth.

14. The depth imager of claim 13, wherein the time-of-flight controller controls the light source to emit a first number of light pulses for the first exposure, and controls the light source to emit a second number of light pulses for the second exposure.

15. The depth imager of claim 14, wherein the exposure weight is based on a ratio of the second number and the first number.

16. The depth imager of claim 13, wherein the blender computes the estimated depth by calculating an average of the first depth and the second depth weighted by the exposure weight.

17. The depth imager of claim 13, wherein the blender outputs the first depth as the adjusted depth if the estimated depth is less than a saturation distance of the second exposure.

18. The depth imager of claim 13, wherein the blender outputs the second depth as the adjusted depth if the estimated depth is greater than a noise tolerance distance of the first exposure.

19. The depth imager of claim 13, wherein the blender outputs an average of the first depth and the second depth as the adjusted depth if the estimated depth is between a saturation distance of the second exposure and a noise tolerance distance of the first exposure, wherein the average is weighted by the exposure weight and the interpolation weight.

20. A depth imager with extended dynamic range, the depth imager comprising:

means for making a first measurement from exposing a scene with a first number of light pulses and a second measurement from exposing the scene with a second number of light pulses;

means for determining a first depth from the first measurement and a second depth from the second measurement;

means for determining an estimated depth based on the first depth and the second depth; and means for outputting an adjusted depth by blending the first depth and the second depth with a combination of (1) an exposure weight relating the first number of light pulses and the second number of light pulses, and (2) an interpolation weight, wherein the interpolation weight is determined based on the estimated depth.

21. The depth imager of claim 20, wherein the exposure weight is based on a ratio of the second number and the first number.

22. The depth imager of claim 20, wherein the estimated depth is an average of the first depth and the second depth weighted by the exposure weight.

23. The depth imager of claim 20, wherein the means for outputting the adjusted depth comprises:

means for outputting the first depth as the adjusted depth if the estimated depth is less than a saturation distance of the second measurement;

means for outputting the second depth as the adjusted depth if the estimated depth is greater than a noise tolerance distance of the first measurement; and means for outputting an average of the first depth and the second depth as the adjusted depth if the estimated depth is between a saturation distance of the second measurement and a noise tolerance distance of the first measurement, wherein the average is weighted by the exposure weight and the interpolation weight.

* * * * *